United States Patent [19]

Sigalla

[11] 4,291,853

[45] Sep. 29, 1981

[54] AIRPLANE ALL-MOVING AIRFOIL WITH MOMENT REDUCING APEX

[75] Inventor: Armand Sigalla, Bellevue, Wash.

[73] Assignee: The Boeing Company, Seattle, Wash.

[21] Appl. No.: 146,386

[22] Filed: May 5, 1980

Related U.S. Application Data

[63] Continuation of Ser. No. 973,165, Dec. 26, 1978, abandoned.

[51] Int. Cl.³ .................... B64C 5/02; B64C 21/00
[52] U.S. Cl. ................................ 244/87; 244/199; 244/200
[58] Field of Search ................ 244/198–200, 244/214, 213, 55, 56, 87, 35 R, 34

[56] References Cited

U.S. PATENT DOCUMENTS

| | | | |
|---|---|---|---|
| 2,650,752 | 9/1953 | Hoadley | 244/199 |
| 2,769,602 | 11/1956 | Furlong | 244/199 |
| 2,800,291 | 7/1957 | Stephens | 244/130 |
| 2,950,879 | 8/1960 | Smith | 244/198 |
| 3,008,291 | 11/1961 | Hardgrave | 244/130 |
| 3,370,810 | 2/1968 | Shevell et al. | 244/199 |
| 3,415,468 | 12/1968 | Labombardo | 244/87 |
| 3,417,946 | 12/1968 | Hartley | 244/87 |

FOREIGN PATENT DOCUMENTS

| | | | |
|---|---|---|---|
| 1809593 | 9/1970 | Fed. Rep. of Germany | 244/199 |
| 479694 | 4/1953 | Italy | 244/200 |

OTHER PUBLICATIONS

Soderman, "Aerodynamic Effects of Leading-Edge Serrations on a Two-Dimensional Airfoil," NASA TMX-2643, Sep., 1972.

*Primary Examiner*—Galen L. Barefoot
*Attorney, Agent, or Firm*—Christensen, O'Connor, Johnson & Kindness

[57] ABSTRACT

Disclosed is an airplane all-moving airfoil having a moment reducing apex for facilitating control of the airfoil. In a preferred embodiment, the apex protrudes forward from the leading edge of an all-moving horizontal stabilizer and operates through its aerodynamic effect on the stabilizer to reduce the moment required to maintain and vary the stabilizer position. Counter-rotating airflow vortices produced by the apex reduce the rearward displacement of the center of pressure on the stabilizer as the stabilizer is deflected into an increasing angle of attack. As a result, lighter weight hydraulic stabilizer and elevator actuating mechanisms can be employed. In a preferred embodiment an aeroelastically flexible apex is employed to enhance moment reduction at high angles of attack.

22 Claims, 5 Drawing Figures

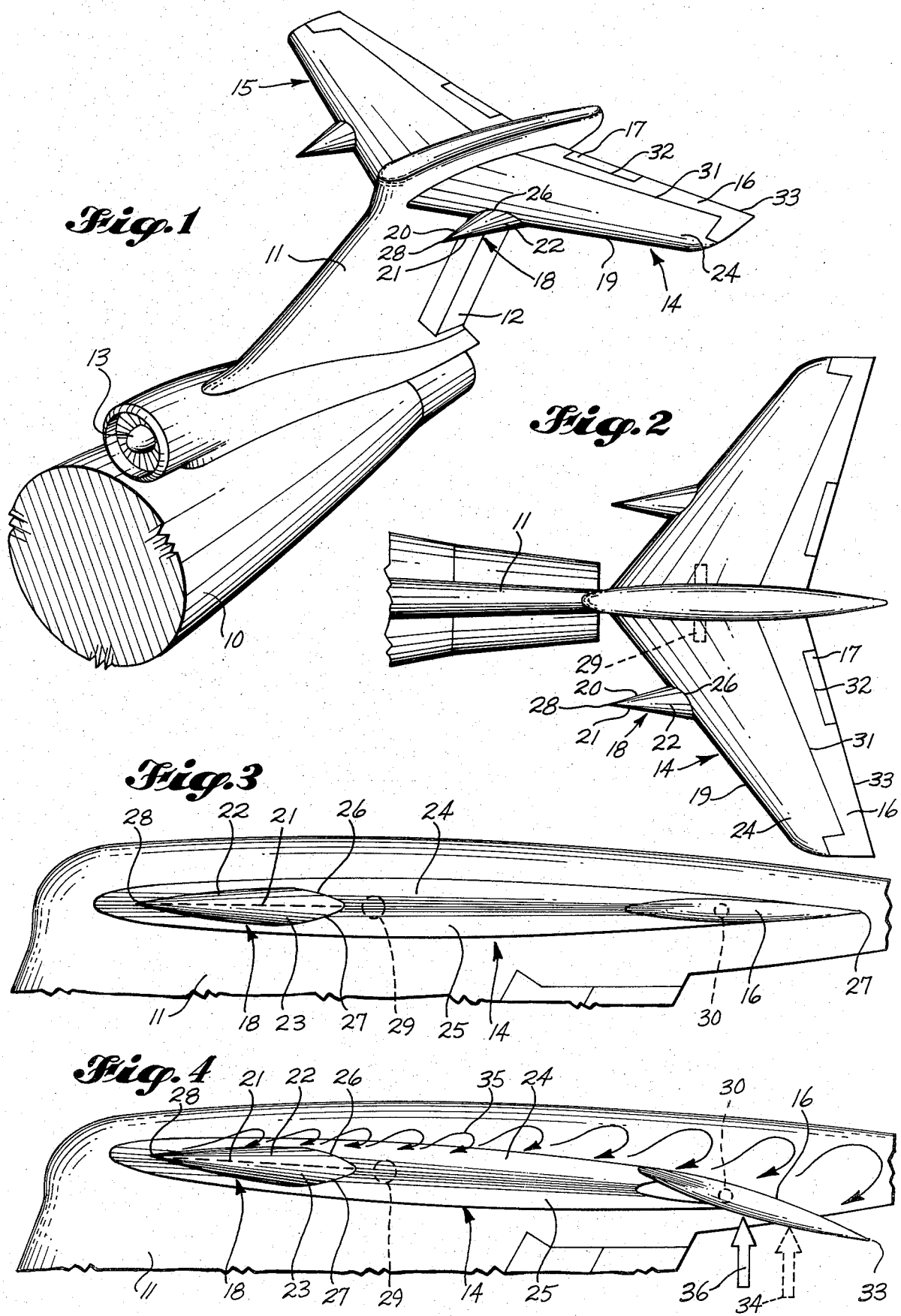

AIRPLANE ALL-MOVING AIRFOIL WITH MOMENT REDUCING APEX

This is a continuation, of application Ser. No. 973,165, filed Dec. 26, 1978 and now abandoned.

BACKGROUND OF THE INVENTION

This invention relates generally to airfoil structures, and, more particularly, to all-moving airfoil structures having vortex generating devices for facilitating control of the airfoil.

Modern jet aircraft frequently employ all-moving horizontal stabilizers wherein the entire horizontal stabilizer may be deflected to control the ascent or descent of the aircraft. An elevator is typically hinged to the stabilizer and faired into its trailing edge to provide further control in a like manner. In addition, the elevator may have one or more elevator trim tabs on its trailing edge.

The stabilizer is typically mounted on a trunion shaft which extends laterally into the stabilizer from the aircraft fuselage, or, in the case of a T-tail aircraft assembly, from the aircraft fin. Deflection of the stabilizer is effected by rotating the trunion shaft. A hydraulic actuator is positioned inside the aircraft fuselage or fin for this purpose.

The elevator is typically mechanically linked to the stabilizer and the stabilizer trunion shaft such that a deflection of the stabilizer in either direction causes a proportional deflection of the elevator in the same direction about its hinge axis. Thus, the single hydraulic actuator within the fuselage or fin drives both the stabilizer and its associated elevator.

In practice, it is found that large moments are required to vary and maintain the deflection of the stabilizer and its elevator during flight, with the required moments being highest when the stabilizer is in a position of maximum deflection. Thus, large and heavy hydraulic actuators are necessarily employed. Since these actuators are located in a part of the plane where weight and size characteristics are particularly critical, they impose certain structural and design limitations upon the tail assembly of the aircraft. For some time it has been recognized that smaller and lighter actuators could be used if a way could be found to reduce the moments exerted about the elevator hinge and stabilizer trunion shaft when the stabilizer is deflected at high angles of attack.

It has been recognized that the large moments are due to rearward displacement of the center of pressure as the stabilizer is deflected, with the center of pressure moving to a maximum rearward position near the center of the elevator as the stabilizer is deflected to a high angle of attack. Thus, a device which reduces the rearward displacement of the center of pressure as the stabilizer is deflected has been sought as a way to reduce the moments about the elevator hinge axis and the stabilizer trunion shaft.

Accordingly, it is the general object of the present invention to provide an all-moving airfoil which requires a relatively smaller moment to vary and maintain its angle of attack.

More particularly, it is an object of the present invention to provide a device which reduces the moments about the elevator hinge and the stabilizer trunion shaft of an airplane all-moving horizontal stabilizer.

It is also an object of the present invention to provide a device which reduces the rearward displacement of the center of pressure on an all-moving stabilizer as the stabilizer is deflected.

It is a further object of this invention to provide a device which accomplishes the foregoing objects and which may be retrofitted onto all-moving horizontal stabilizers of existing airplanes.

SUMMARY OF THE INVENTION

The present invention consists generally of an all-moving airfoil having a protruding apex located on its leading edge. The invention is particularly adapted to all-moving horizontal stabilizers of modern commercial jet airplanes. In the preferred embodiment, the moment reducing apex has generally the shape of a double-bladed arrowhead and protrudes forward along a chordline from the leading edge of an all-moving horizontal stabilizer. The apex is relatively flat and will be generally faired into the upper and lower surfaces of the stabilizer.

When the stabilizer is deflected, the leading edges of the protruding apex produce counter-rotating airflow vortices across the low-pressure surfaces of the horizontal stabilizer and elevator. The effect of each of these vortices is to energize the boundary layer of air along the surfaces of the stabilizer and elevator and thereby increase the lift on those surfaces. The vortex lift effect of the protruding apex is greatest in the region immediately behind the apex and diminishes relatively rapidly toward the trailing edge of the stabilizer and elevator. Thus, the net effect of this additional vortex lift near the stabilizer leading edge is to cause a small moment to be exerted about the stabilizer trunion shaft in the direction of deflection of the stabilizer leading edge. The effect of this additional lift is also to reduce the rearward displacement of the center of pressure as the stabilizer is deflected.

In the absence of the apex, the center of pressure is typically located near the center of the elevator surface when the stabilizer is in a position of maximum deflection. Typically, the effect of the apex under such conditions is to move the center of pressure forward on the elevator surface toward the elevator hinge line. This effectively reduces the hinge moment about the elevator hinge and thereby also reduces the moment about the stabilizer trunion shaft.

The above described effect is produced only when the all-moving stabilizer is in a deflected position. During level flight, the protruding apex has no angle of attack and no net effect is produced on the elevator because vortex airflow produced by the apex is approximately equal on the upper and lower surfaces. Thus, during level flight the apex is essentially non-functional except for providing a negligible amount of additional lift.

In a preferred embodiment of the invention, the forwardly protruding apex is aeroelastically constructed such that the apex is flexible within a vertical plane passing through the apex chordline. During level flight the apex is unstressed and does not flex. When the stabilizer is deflected, airflow drag flexes the apex in the direction in which the leading edge of the horizontal stabilizer is deflected. The vortex airflow generated by the apex is thereby enhanced due to the flexing of the apex into a greater angle of attack than the angle of attack of the stabilizer, with the result that the moments about the trunion shaft and elevator hinge are further reduced over that which can be attained with a rigid apex.

As a result of reducing the moments about the stabilizer trunion shaft and the elevator hinge, smaller and lighter-weight actuators can be employed to drive the stabilizers and elevators of an airplane. This has significant advantages for aircraft design and construction even aside from the obvious general advantages of using smaller and lighter mechanical components in an airplane. For example, this invention may facilitate the use of thinner airfoil structures in T-tail aircraft. Also, the device may further facilitate the use of integrated actuator systems wherein a remote electrically powered actuator is substituted for a conventional hydraulic actuator with its long and heavy hydraulic lines. Such integrated actuator systems have heretofore been impractical at least partially because of the large power outputs required to drive conventional all-moving stabilizers and elevators.

If desired more than one such apex can be installed on each stabilizer leading edge. The spacing and location may be established by design to minimize torsional (twist) effects on the stabilizer due to lift effects of the individual apexes.

BRIEF DESCRIPTION OF THE DRAWINGS

FIG. 1 is a perspective view of the present invention installed on the all-moving horizontal stabilizers of a modern commercial jet airplane.

FIG. 2 is a plan view of the embodiment illustrated in FIG. 1.

FIG. 3 is a side view of the left-hand all-moving horizontal stabilizer of FIG. 1, as it might be positioned during level flight.

FIG. 4 is a side view similar to FIG. 3 with the horizontal stabilizer positioned at a relatively high positive angle of attack.

DESCRIPTION OF THE PREFERRED EMBODIMENT

Figure 5:
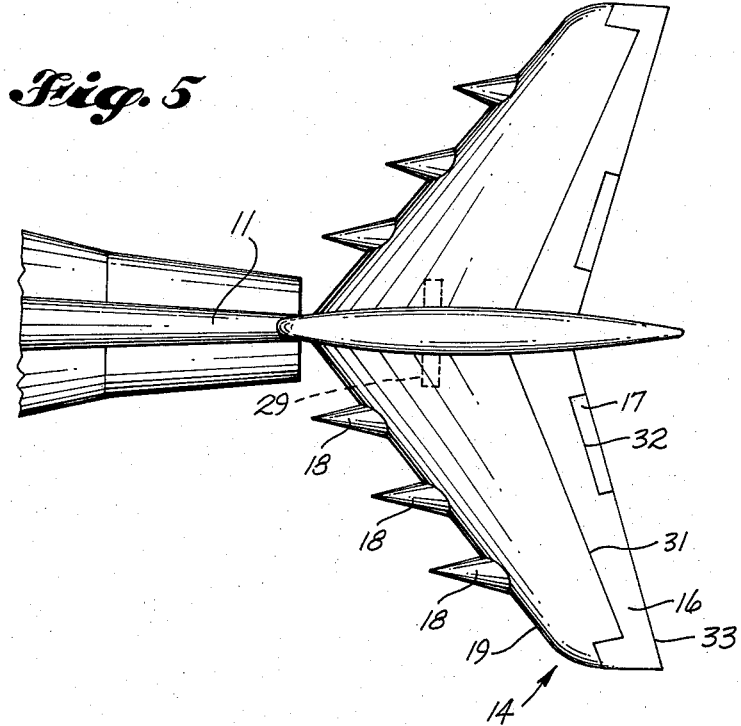
FIG. 5 is a plan view of an embodiment of the present invention wherein three apexes are mounted on each stabilizer.

Referring to FIGS. 1 through 4, inclusive, a preferred embodiment of the present invention is illustrated as installed on the all-moving horizontal stabilizers of a modern commercial jet airplane. The following description concerns the embodiment illustrated on the left hand stabilizer, but it will be understood that this description is equally applicable to the identically constructed device mounted on the right hand stabilizer in symmetry with that on the left side.

FIGS. 1 and 2 depict the tail end of a jet airplane having a fuselage 10 and a vertical stabilizer or fin 11 extending upwardly therefrom. The fin 11 is equipped with a rudder 12 for lateral control. In the particular aircraft illustrated, a jet engine air intake 13 is located on top of the fuselage 10 forward of the fin 11. The aircraft illustrated has what is known in the industry as a T-tail, wherein left and right horizontal stabilizers 14 and 15, respectively, extend laterally with rearward sweep, negligible camber and a small upward dihedral angle from the upper end of the fin 11.

Referring in particular to left stabilizer 14 is FIGS. 1 through 4, left stabilizer 14 is equipped with an elevator 16 and an elevator trim tab 17. Left stabilizer 14 is further equipped with a preferred embodiment of the present invention, a moment reducing apex 18 in the form of a forwardly tapered, generally horizontal wedge extending forward along a chord line from the leading edge 19 of left stabilizer 14.

The apex 18 has an inboard leading edge 20 and an outboard leading edge 21 having sweep angles which are substantially greater than the sweep angle of the stabilizer leading edge 19 and which are approximately equal to one another. The upper surface 22 and the lower surface 23 of the apex 18 are generally symmetrically shaped and are faired into the upper surface 24 and lower surface 25 of the stabilizer 14 along faired junctures 26 and 27, respectively. The upper and lower surfaces 22 and 23 and leading edges 20 and 21 converge at an apex tip 28.

Conventional operation of left all-moving stabilizer 14 involves rotation of the stabilizer 14 about a transverse horizontal trunion shaft 29 and simultaneous rotation of the elevator 16 about a hinge 30 generally located along an elevator hinge line 31. Trim tab 17 may also be rotated about a trim tab hinge line 32. FIG. 3 illustrates the stabilizer 14 and elevator 16 as they are typically positioned during level, or trimmed, flight. FIG. 4 illustrates the stabilizer 14 and the elevator 16 in deflected positions as might be used to compensate for a rearward shift of load within the fuselage or a controlled downward turn of the airplane. Both the stabilizer 14 and the elevator 16 are normally driven by a single hydraulic actuator (not shown) positioned within the fin 11 and acting directly on the trunion shaft 29 to deflect the stabilizer 14. The elevator 16 is mechanically linked to the stabilizer 14 and shaft 29 such that rotation of the stabilizer 14 about the trunion shaft 29 automatically rotates the elevator 16 in the same direction about its hinge 30 at a considerably higher angular rate.

When the stabilizer 14 and the elevator 16 are in maximum deflected positions, as in FIG. 4, the induced drag and various lift forces produce a center of pressure which, on any particular chord line drawn through the stabilizer 14 and elevator 16, is typically located rearward of the hinge line 31. The effective average center of pressure, as it might exist during normal operation in the absence of the present invention, is illustrated by dashed arrow 34. Such a center of pressure produces a large moment about the elevator hinge 30, as well as a large moment about the trunion shaft 29. These moments must be counteracted by the hydraulic actuator driving the stabilizer 14 and elevator 16, thus requiring a relatively heavy and bulky actuator.

When the hinge moment apex 18 is installed as described above on the leading edge 19 of stabilizer 14 along a chord line passing through the elevator 16, vortex flow 35 is generated by the apex leading edges 20 and 21. The vortex flow 35 energizes the boundary layer of air and causes vortex lift which is greatest immediately behind the apex 18 and diminishes rapidly toward the trailing edge 33 of the elevator 16. This causes the center of pressure to exist at a position on the elevator 16 approximated by solid arrow 36. Since the center of pressure 36 is shifted toward the hinge 30 of the elevator 16 relative to its position in the absence of the present invention, the moments exerted about both the elevator hinge 30 and the stabilizer trunion shaft 29 are effectively reduced. Consequently, a relatively lighter-weight and smaller actuator may be employed to vary and maintain the same degree of deflection as was originally attained with a heavier actuator in the absence of the apex 18.

The precise position of the hinge moment apex 18 along the leading edge 19 of the stabilizer 14 is not particularly critical, but is constrained within limits by several factors. First, the apex should be located along a chord line forward of the elevator 16, so that the moment about the elevator hinge line 31 is most effectively reduced by the apex 18. Within the limits of that constraint, the apex 18 should further be located at the widest portion of the stabilizer 14, yet spaced from the fuselage 10 or fin 11 in order to avoid adverse effects of airflow around the fuselage 10. Since the widest portion of the stabilizer 14 is normally at its junction with the fuselage 10 or fin 11, where airflow disturbances from the fuselage 10 are greatest, the hinge moment apex 18 will normally be spaced from the fuselage 10 by the minimum distance necessary to avoid the effects of fuselage airflow. Positioning the apex 18 a distance of approximately one third the span of the stabilizer 14 from the fuselage 10 or fin 11 is preferably in practice.

The shape and size of the apex 18 may be varied within certain limits set by aerodynamic considerations. For example, the length of the apex 18 should not be greater than approximately half the maximum chordwise length of the stabilizer 14. The thickness of the apex 18 should not be greater than approximately three times the maximum thickness of the stabilizer 14. Finally, the sweep angles of the leading edges 20 and 21 of the apex 18, although greater than the sweep angle of the stabilizer leading edge 19, as described above, should be not greater than approximately 80° with respect to an orthogonal axis transverse to the longitudinal axis of the airplane fuselage 10.

In a preferred embodiment, the apex 18 is aeroelastically constructed so as to be flexible in a vertical plane parallel to the chordline of the apex 18. When the stabilizer 14 is deflected, airflow flexes the apex 18 into a flexed position wherein the apex 18 is at a higher angle of attack than the stabilizer 14. Thus, greater vortex airflow is generated by the apex 18 and greater vortex lift is produced. As a result, a larger reduction in the moments about the hinge 30 and trunion shaft 29 is attained than can be attained with a rigid apex of the same dimensions.

In another embodiment of the present invention, illustrated in FIG. 5, several hinge moment apexes 18 may be employed along the leading edge 19 of the horizontal stabilizer 14. The positioning of a plurality of apexes 18 is governed by the same constraints described above, with the further constraint that vortex airflows from each apex 18 not interfere with one another.

Although the present invention has been described in terms of a preferred embodiment on an airplane horizontal stabilizer, the invention is of general applicability to any aircraft all-moving airfoil which is rotatable about a transverse axis. For example, the moments required to actuate an all-moving wing or vertical fin could be reduced by employment of the present invention.

It should be recognized by those skilled in the art that the embodiment depicted herein is exemplary in nature and that various additions, alterations and modifications may be made without departing from the scope and spirit of this invention.

The embodiments of the invention in which an exclusive property or privilege is claimed are defined as follows:

1. An all-moving horizontal stabilizer for an aircraft, said stabilizer being rotatable with respect to a fixed portion of the aircraft to which the stabilizer is attached, said stabilizer being rotatable about a control axis extending generally spanwise of the stabilizer from said fixed portion of the aircraft, said stabilizer having a leading edge and a moment reducing apex, said apex projecting forwardly from said leading edge to a tip lying generally in the body plane of said stabilizer, said apex being spaced along said leading edge outwardly from said fixed portion of the aircraft to avoid substantial adverse interference effects, said apex having oppositely swept inboard and outboard leading edges mutually converging forwardly toward said tip and spaced apart at said leading edge of said stabilizer by a minor fraction of the spanwise length of said leading edge, said apex having upper and lower apex surfaces which mutually converge spanwise of the stabilizer to said inboard and outboard leading edges of said apex, whereby said apex forms counterrotating airflow vortices to reduce the moment of force required to rotate said stabilizer about said control axis.

2. The all-moving horizontal stabilizer defined in claim 1 wherein said inboard and outboard leading edges of said moment reducing apex have substantially equal sweep angles along substantially the full length thereof.

3. The all-moving horizontal stabilizer defined in claim 2 wherein said apex is generally ovoid in cross-sections taken perpendicular to a chordwise direction, and wherein the vertical thickness of said apex progressively decreases forwardly from said leading edge of said stabilizer.

4. The all-moving horizontal stabilizer defined in claim 3 wherein said horizontal stabilizer has upper and lower stabilizer surfaces into which are faired said upper and lower apex surfaces, respectively.

5. The all-moving horizontal stabilizer defined in claim 1, 2, 3 or 4 wherein said apex is aeroelastically flexible in a chordwise plane perpendicular to the body plane of the stabilizer such that, upon deflection of said stabilizer about said control axis during flight, said apex flexes relative to the stabilizer in the direction of such deflection and thereby assumes a greater angle of attack than said stabilizer.

6. The all-moving horizontal stabilizer defined in claim 5 comprising a plurality of said moment reducing apexes positioned along said leading edge of said stabilizer to avoid substantial interference effects with one another.

7. In an airplane having an all-moving horizontal stabilizer rotatable about a control axis extending generally spanwise from a fixed portion of the tail of said airplane, said horizontal stabilizer including a leading edge and upper and lower stabilizer surfaces, the improvement comprising a moment reducing apex, said apex projecting forwardly from said leading edge of said stabilizer to a tip, said apex lying generally in the plane of said stabilizer, said apex having inboard and outboard leading edges mutually converging forwardly toward said tip and spaced apart at said leading edge of said stabilizer by a minor fraction of the spanwise length of said leading edge, said apex being spaced outwardly along said leading edge of said stabilizer from said fixed portion of the tail of said airplane and positioned along said leading edge to avoid substantial adverse interference effects, said apex having upper and lower apex surfaces which mutually converge spanwise toward said inboard and outboard leading edges of said apex, whereby said apex forms counterrotating airflow vortices to reduce the moment of force required to rotate said stabilizer about said control axis.

8. The improvement defined in claim 7 wherein said inboard and outboard leading edges of said moment reducing apex have substantially equal sweep angles along substantially the full length thereof.

9. The improvement defined in claim 8 wherein said apex is generally ovoid in cross-sections taken perpendicular to a generally chordwise direction, and wherein the vertical thickness of said apex progressively decreases forwardly from said leading edge of said stabilizer.

10. The improvement defined in claim 9 wherein said upper and lower apex surfaces of said apex are faired into the upper and lower stabilizer surfaces, respectively.

11. The improvement defined in claim 10 wherein said apex is aeroelastically flexible in a generally vertical chordwise plane passing through the tip of said apex, such that upon deflection of said stabilizer about said control axis during flight, said apex flexes relative to the stabilizer in the direction of such deflection and thereby assumes a greater angle of attack than said stabilizer.

12. The improvement defined in claim 11 comprising a plurality of said moment reducing apexes positioned along said leading edge of said stabilizer to avoid substantial interference effects with one another.

13. An all-moving horizontal stabilizer for an aircraft, said stabilizer being rotatable with respect to a fixed portion of the aircraft to which the stabilizer is attached, said stabilizer being rotatable about a control axis extending generally spanwise of the stabilizer from said fixed portion of the aircraft, said stabilizer having a leading edge and moment reducing means, said moment reducing means consisting of an apex projecting forwardly from said leading edge to a tip lying generally in the body plane of said stabilizer, said apex being spaced along said leading edge outwardly from said fixed portion of the aircraft so as to avoid substantial adverse interference effects with said fixed portion of said aircraft, said apex having oppositely swept inboard and outboard leading edges mutually converging forwardly toward said tip and spaced apart at said leading edge of said stabilizer by a minor fraction of the spanwise length of said leading edge, said apex having upper and lower apex surfaces which mutually converge spanwise of the stabilizer to said inboard and outboard leading edges of said apex, whereby said apex forms counterrotating airflow vortices to reduce the moment of force required to rotate said stabilizer about said control axis.

14. The all-moving horizontal stabilizer defined in claim 13 wherein said inboard and outboard leading edges of said moment reducing apex have substantially equal sweep angles along substantially the full length thereof.

15. The all-moving horizontal stabilizer defined in claim 13 wherein said apex is generally ovoid in cross sections taken perpendicular to a chordwise direction, and wherein the vertical thickness of said apex progressively decreases forwardly from said leading edge of said stabilizer.

16. The all-moving horizontal stabilizer defined in claim 13 wherein said horizontal stabilizer has upper and lower stabilizer surfaces into which are faired said upper and lower apex surfaces, respectively.

17. The all-moving horizontal stabilizer defined in claim 13, wherein said apex is aeroelastically flexible in a chordwise plane perpendicular to the body plane of the stabilizer such that, upon deflection of said stabilizer about said control axis during flight, said apex flexes relative to the stabilizer in the direction of such deflection and thereby assumes a greater angle of attack than said stabilizer.

18. In an airplane having an all-moving horizontal stabilizer rotatable about a control axis extending generally spanwise from a fixed portion of the tail of said airplane, said horizontal stabilizer including a leading edge, the improvement comprising moment reducing means consisting of an apex projecting forwardly from said leading edge of said stabilizer to a tip, said apex lying generally in the plane of said stabilizer, said apex having inboard and outboard leading edges mutually converging forwardly toward said tip and spaced apart along said leading edge of said stabilizer by a minor fraction of the spanwise length of said leading edge, said apex being spaced outwardly along said leading edge of said stabilizer from said fixed portion of the tail of said airplane to avoid substantial adverse interference effects with said fixed portion, said apex having upper and lower apex surfaces which mutually converge spanwise toward said inboard and outboard leading edges of said apex, whereby said apex forms counterrotating airflow vortices to reduce the moment of force required to rotate said stabilizer about said control axis.

19. The improvement defined in claim 18 wherein said inboard and outboard leading edges of said moment reducing apex have substantially equal sweep angles along substantially the full length thereof.

20. The improvement defined in claim 18 wherein said apex is generally ovoid in cross section taken perpendicular to a generally chordwise direction, and wherein the vertical thickness of said apex progressively decreases forwardly from said leading edge of said stabilizer.

21. The improvement defined in claim 18 wherein stabilizer includes upper and lower stabilizer surfaces and wherein said upper and lower apex surfaces of said apex are faired into said upper and lower stabilizer surfaces, respectively.

22. The improvement defined in claim 18 wherein said apex is aeroelastically flexible in a generally vertical chordwise plane passing through the tip of said apex, such that upon deflection of said stabilizer about said control axis during flight, said apex flexes relative to the stabilizer in the direction of said deflection and thereby assumes the greater angle of attack than said stabilizer.

* * * * *